(12) United States Patent
van der Gaag et al.

(10) Patent No.: US 9,910,264 B1
(45) Date of Patent: Mar. 6, 2018

(54) CONTACT OF SPACERS TO PIXEL WALLS IN AN ELECTROWETTING DEVICE

(71) Applicant: Amazon Technologies, Inc., Seattle, WA (US)

(72) Inventors: Jeroen Cornelis van der Gaag, Mierlo (NL); Maurice Hendrikus Hubertinus Thijssen, Deurne (NL); Christian Etienne Hendriks, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 676 days.

(21) Appl. No.: 14/313,876

(22) Filed: Jun. 24, 2014

(51) Int. Cl.
*G02F 1/153* (2006.01)
*G02B 26/00* (2006.01)
*B32B 37/00* (2006.01)

(52) U.S. Cl.
CPC .......... *G02B 26/005* (2013.01); *B32B 37/025* (2013.01)

(58) Field of Classification Search
USPC ............. 359/290, 238, 267, 295, 900
See application file for complete search history.

(56) References Cited

U.S. PATENT DOCUMENTS

2014/0029080 A1* 1/2014 Hwang ............... G02B 26/005
359/290

* cited by examiner

*Primary Examiner* — Jack Dinh
(74) *Attorney, Agent, or Firm* — EIP US LLP

(57) ABSTRACT

Subject matter disclosed herein relates to arrangements and techniques that provide for improving contact between spacers of a first substrate of an electrowetting display device and pixel walls of a second substrate of the electrowetting display device by providing an adhesive between the spacers and the pixel walls. An electrowetting display device comprises a first substrate including a plurality of pixel walls and a second substrate including a plurality of spacers. A first fluid is disposed between the first substrate and the second substrate within the pixel walls. A second fluid is disposed on the first fluid, wherein the first fluid is immiscible with the second fluid. An adhesive couples the spacers to the pixel walls.

24 Claims, 7 Drawing Sheets

CONTACT OF SPACERS TO PIXEL WALLS IN AN ELECTROWETTING DEVICE

BACKGROUND

Many portable electronic devices include displays for displaying various types of images. Examples of such displays include electrowetting displays (EWDs), liquid crystal displays (LCDs), electrophoretic displays (EPDs), light emitting diode displays (LED displays), etc. In EWD applications, a plurality of pixels is defined between first and second substrates or support plates that are coupled together. The plurality of pixels is generally defined by pixel walls on the first substrate. In various EWD applications, spacers on the second substrate engage the pixel walls. The spacers provide mechanical support that protect the EWD from damage due to physical impact. The spacers also maintain a parallel distance between the two substrates, i.e. the spacers help maintain a consistent pixel cell height.

Furthermore, the second substrate in the EWD generally comprises glass and the spacers help prevent the glass substrate from bending and touching the first substrate. If the glass substrate bends and contacts the first substrate, electrowetting oil in the pixel may stick to the glass substrate. Such an "oil pick-up" is a non-reversible fault that causes black spots and empty pixels within the EWD. Additionally, since the height of the spacers and the height of the pixel walls can vary due to manufacturing tolerances, gaps between the spacers and the pixel walls can occur. Applying pressure to the glass substrate and moving the pressure can cause a "whitening" effect in the EWD. This whitening effect is generally a streaking white appearance on the EWD. Fluid that includes an electrolyte and the electrowetting oil are generally moved among the pixel cells thereby creating the whitening effect. The oil pick-up and the whitening effect are generally attributable to movement of the spacers and the pixel walls relative to each other.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1A:
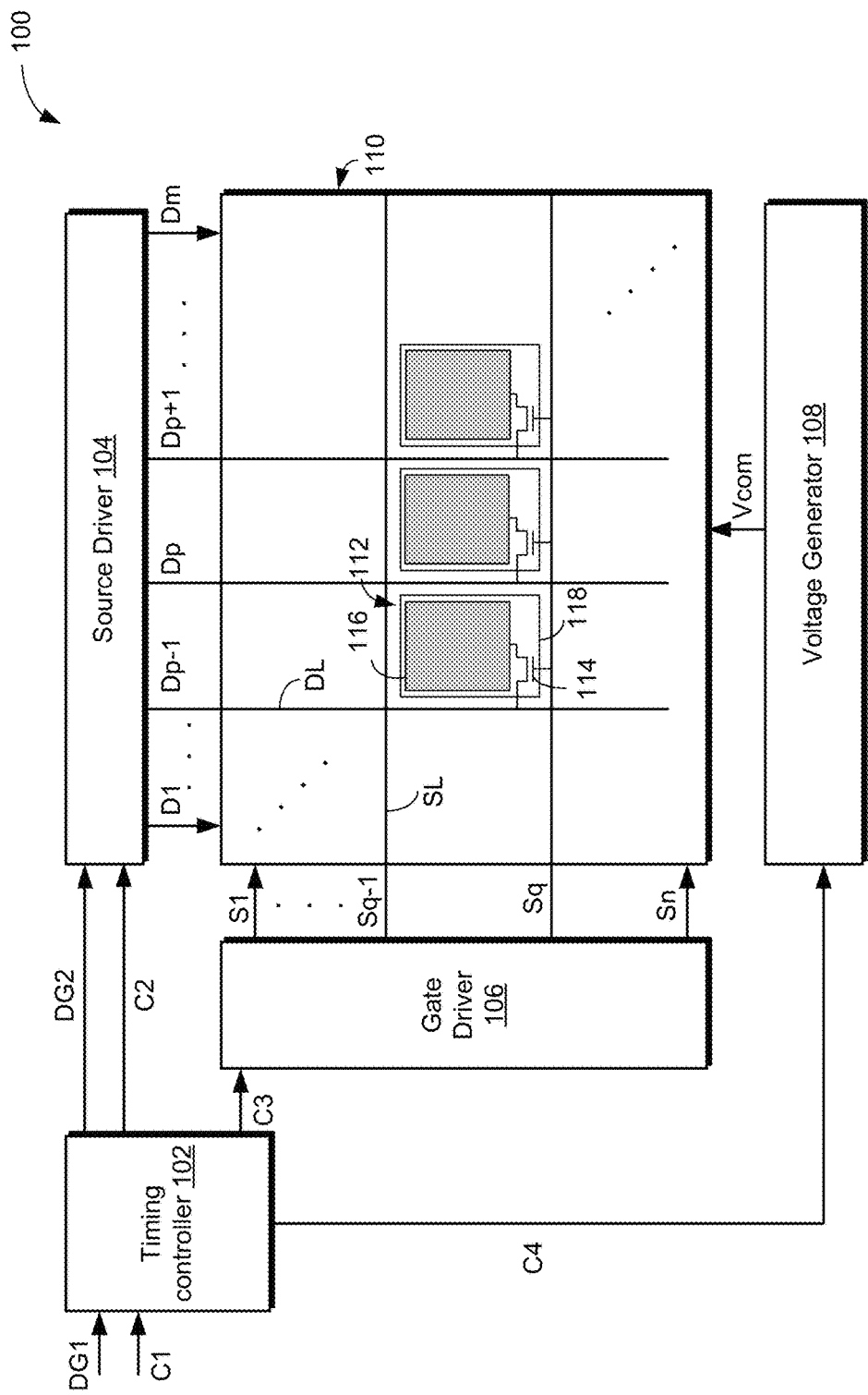
FIG. 1A is a schematic view of an example of an electrowetting display device, according to various embodiments.

The present disclosure provides arrangements and techniques that provide for improving contact between spacers of a first substrate of an electrowetting display device and pixel walls of a second substrate of the electrowetting display device by providing an adhesive between the spacers and the pixel walls.

In general, image display apparatuses, such as, for example, various electronic devices, including, but not limited to, portable computing devices, tablet computers, laptop computers, notebook computers, mobile phones, personal digital assistants (PDAs), and portable media devices (e.g., e-book devices, DVD players, etc.), display images on a display. Examples of such displays include, but are not limited to, LCDs, EWDs and EPDs.

More particularly, a display device, such as an electrowetting display device, for example, can be a thin film transistor electrowetting display (TFT-EWD) that generally includes an array of transmissive, reflective and/or transflective pixels configured to be operated by an active matrix addressing scheme. For example, rows and columns of pixels are operated by controlling voltage levels on a plurality of source lines and gate lines. In this fashion, the display device can produce an image by selecting particular pixels to transmit, reflect or block light. Pixels are addressed (e.g., selected) via rows and columns of the source lines and gate lines that are connected to transistors (e.g., used as switches) included in each pixel. Transistors take up a relatively small fraction of the area of each pixel. For example, the transistor can be located underneath the reflector in reflective displays.

Electrically, the pixel is a small capacitor with a layer of insulating optical material (e.g., liquid crystal material or electrowetting material) sandwiched between two substrates, wherein each substrate generally includes a transparent conductive indium tin oxide (ITO) layer. A one-way current-passing characteristic of the transistor of the pixel prevents charge that is being applied to the pixel from draining between refresh cycles of the display's image.

An electrowetting display employs an applied voltage to change the surface tension of a fluid in relation to a surface. For instance, by applying a voltage to a hydrophobic surface via a pixel electrode in conjunction with a common electrode, the wetting properties of the surface can be modified so that a second fluid has a greater affinity for the surface. Hydrophobic generally refers to repelling polar fluids while hydrophilic generally refers to having an affinity for polar fluids. As one example of an electrowetting display, the modification of the surface energy by applying a voltage causes the electrolyte, considered to be the second fluid, in an electrowetting fluid in individual pixels of the display to adhere to the modified surface and thus, replace a colored electrowetting oil layer in individual pixels of the display. The electrowetting oil layer is generally made up of an oil that is electrically non-conductive and may for instance be an alkane like hexadecane or silicone oil. Thus, the electrowetting fluids in the individual pixels of the display responding to the change in surface tension act as an optical switch. When the voltage is absent, the colored electrowetting oil forms a continuous film within a pixel, and the color may thus be visible to a user of the display. On the other hand, when the voltage is applied to the pixel, the colored electrowetting oil is displaced and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video and/or static content. In addition, the low power consumption of electrowetting displays in general makes the technology suitable for displaying content on portable display devices that rely on battery power.

In general, an electrowetting display device is made up of two substrates that are coupled together, with the various pixels and fluids located there between. One of the substrates includes pixel walls that define the individual pixels (or subpixels). The other substrate includes spacers that are generally aligned with at least portions of the pixel walls. When the two substrates are coupled together to create the electrowetting display device, the spacers and pixel walls engage one another. An adhesive is provided on the spacers such that when the spacers engage the pixel walls, the spacers are coupled to the pixel walls. The adhesive helps prevent relative movement between the spacers and the pixel walls, as well as filling in gaps created by differences in the height of the spacers and the height of the pixel walls due to manufacturing tolerances. The adhesive may be transparent, have a refractive index equal to or substantially equal to that of the pixel wall material or the spacer material, colored (with dyes or pigments, or the solvent may contain dyes or pigments) or black (i.e., opaque). The addition of a colored adhesive or opaqueness of the adhesive provides the advantages of enhanced color intensity of the display device and additional contrast of the display device respectively. The adhesive have a refractive index equal to or substantially equal to that of the pixel wall material or the spacer material.

Referring to FIG. 1A, an example of an electrowetting display device 100 is schematically illustrated that includes a timing controller 102, a source driver (data driver) 104, a gate driver (scan driver) 106, a voltage generator 108, and an electrowetting display panel 110. The electrowetting display panel 110 is driven by the timing controller 102, the source driver 104, the gate driver 106, and the voltage generator 108.

As an example of general operation of the electrowetting display device 100, responsive to a first data signal DG1 and a first control signal C1 from an external source, e.g., a graphic controller (not illustrated), the timing controller 102 applies a second data signal DG2 and a second control signal C2 to the source driver 104; a third control signal C3 to the gate driver 106; and a fourth control signal C4 to the voltage generator 108.

The source driver 104 converts the second data signal DG2 to voltages, i.e., data signals, and applies the data signals D1, . . . , Dp−1, Dp, Dp+1, . . . , Dm to the electrowetting display panel 110. The gate driver 106 sequentially applies scan signals S1, . . . , Sq−1, Sq, . . . , Sn to the electrowetting display panel 110 in response to the third control signal C3.

The voltage generator 108 applies a common voltage Vcom to the electrowetting display panel 110 in response to the fourth control signal C4. Although not illustrated in FIG. 1A, the voltage generator 108 generates various voltages required by the timing controller 102, the source driver 104, and the gate driver 106.

The electrowetting display panel 110 includes m data lines D, i.e., source lines, to transmit the data voltages and n gate lines S, i.e., scan lines, to transmit a gate-on signal.

Pixel areas 112 are positioned adjacent to crossing points of the data lines D and the gate lines S crossing the data lines D and thus are arranged in a grid of rows and columns. Each pixel area 112 is made up of a hydrophobic surface that includes a thin film transistor 114 and a pixel electrode 116 under the hydrophobic surface. Each pixel area 112 may also include a storage capacitor (not illustrated) under the hydrophobic surface. A pixel wall 118 defines the pixel area 112.

Pixel areas 112 can represent pixels within the electrowetting display device 100 or sub-pixels within the electrowetting display device 100, depending upon the application for the electrowetting display device 100.

Figure 1B:
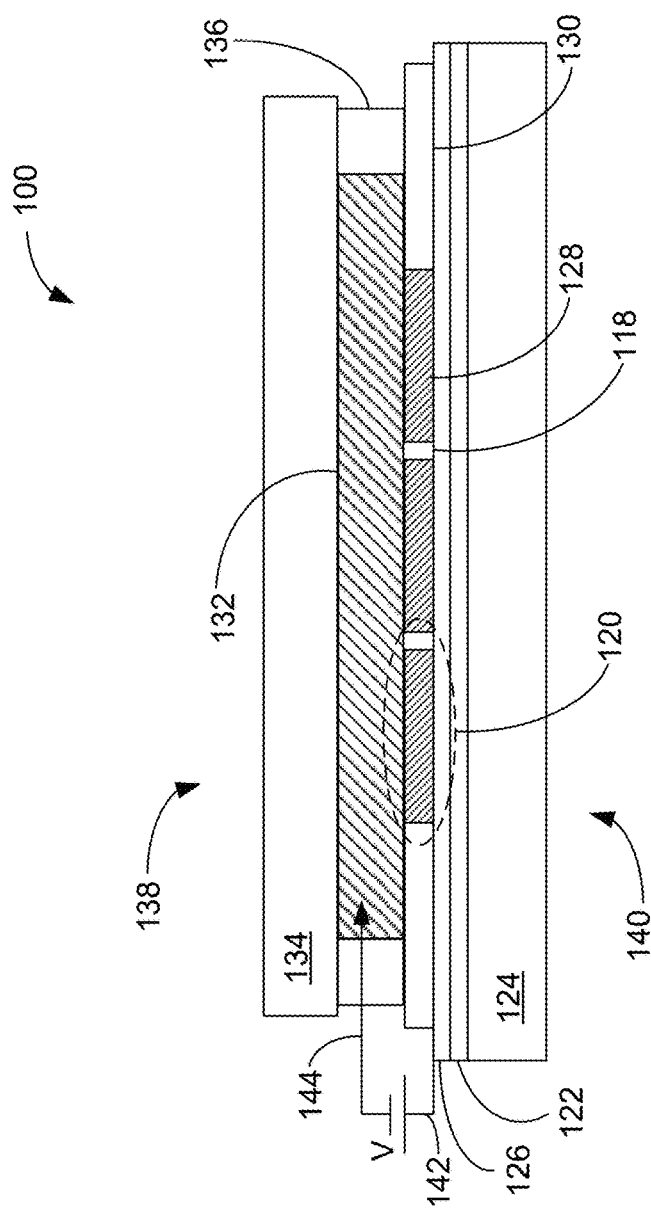
FIG. 1B is a cross-section of a portion of the electrowetting display device of FIG. 1A, according to some embodiments.

FIG. 1B is a cross-section of a portion of the electrowetting display device 100 illustrating several electrowetting elements 120 that generally correspond to pixel areas 112, according to some embodiments. An electrode layer 122 that includes the pixel electrodes 116 (not illustrated in FIG. 1B) is formed on a bottom substrate or support plate 124. Generally, the electrode layer 122 comprises indium tin oxide (ITO). In some implementations, a dielectric barrier layer (not illustrated) may at least partially separate the electrode layer 122 from a hydrophobic layer 126 also formed on the bottom substrate 124 over the electrode layer 122. In some implementations, the hydrophobic layer 126 can comprise a fluoropolymer, such as, for example, AF1600, produced by DuPont, based in Wilmington, Del. The pixel walls 118 form a patterned electrowetting element grid on the hydrophobic layer 126, as can be seen in FIG. 1A. The pixel walls 118 may comprise a photoresist material, such as, for example, epoxy-based negative photoresist SU-8. The patterned electrowetting element grid comprises rows and columns that form an electrowetting element array (e.g., electrowetting display panel 110) of field electrowetting elements and border electrowetting elements. For example, an electrowetting element can have a width and length in a range of about 50 to 500 microns. A first fluid 128, which can have a thickness in a range of about 1 to 10 microns, for example, overlies the hydrophobic layer 126. The first fluid 128 is generally an electrowetting oil and is partitioned by the pixel walls 118 of the patterned electrowetting element grid. An outer rim 130 can comprise the same material as the pixel walls 118. A second fluid 132, such as a fluid that includes an electrolyte and thus is an electroconductive or polar liquid, overlies the electrowetting oil 128 and the pixel walls 118 of the patterned electrowetting element grid.

A top substrate or support plate 134 covers the second fluid 132 and an adhesive/sealing material 136 retains the second fluid 132 over the electrowetting element array. The adhesive/sealing material 136 generally comprises ultraviolet (UV) curable epoxy glue, although other types of adhesive/sealing material are acceptable. The bottom substrate 124 and the top substrate 134 may be separate parts of individual electrowetting elements or the bottom substrate 124 and the top substrate 134 may be shared by a plurality of electrowetting elements. The bottom substrate 124 and the top substrate 134 may be made of glass or polymer and may be rigid or flexible, for example.

A voltage V applied across the second fluid 132 and the dielectric barrier layer stack (e.g., the hydrophobic layer 126) of individual electrowetting elements can control transmittance or reflectance of the individual electrowetting elements.

The electrowetting display device 100 has a viewing side 138 on which an image for display formed by the electrowetting display device 100 can be viewed, and a rear side 140. The top substrate 134 faces viewing side 138 and the bottom substrate 124 faces the rear side 140. The top substrate 134 is coupled to the bottom substrate 124 with the adhesive/sealing material 136. In an alternative embodiment, the electrowetting display device 100 may be viewed from the rear side 140. The electrowetting display device 100 may be a reflective, transmissive or transreflective type. The electrowetting display device 100 may be a segmented display type in which the image is built up of segments. The segments can be switched simultaneously or separately. Each segment includes one electrowetting element 120 or a number of electrowetting elements 120 that may be neighboring or distant from one another. The electrowetting elements 120 included in one segment are switched simultaneously, for example. The electrowetting display device 100 may also be an active matrix driven display type or a passive matrix driven display, just to name a few examples.

The second fluid 132 is immiscible with the first fluid 128. Generally, immiscible refers to the inability of the second fluid 132 to mix or blend with the first fluid 128. The second fluid 132 generally includes an electrolyte and is electrically conductive or polar. The second fluid 132 may be water or a salt solution such as a solution of potassium chloride in a mixture of water and ethyl alcohol, for example. The second fluid may comprise at least one component selected from the group consisting of: ethylene glycol; diethyleneglycol; polyethylene glycol; propylene glycol; dioxalane; glyoxal; citric acid; oxalic acid; oxamic acid; and formic acid; and includes a second component which is different from the first component and is selected from the group consisting of: erythritol; ethylene glycol; ethylene carbonate; propylene carbonate; glycerol; and butanetriol.

The second fluid 132 is preferably transparent, but may be colored, white, absorbing or reflecting. The first fluid 128, generally referred to as electrowetting oil, is electrically non-conductive and may for instance be an alkane like hexadecane or (silicone) oil. The hydrophobic layer 126 is arranged on the bottom substrate 124 to create an electrowetting surface area. The hydrophobic character causes the first fluid 128 to adhere preferentially to the bottom substrate 124 since the first fluid 128 has a higher wettability with respect to the surface of the hydrophobic layer 126 than it has with respect to the second fluid 132. Wettability relates to the relative affinity of a fluid for the surface of a solid. Wettability increases with increasing affinity, and it can be measured by the contact angle formed between the fluid and the solid and measured internal to the fluid of interest. For example, such a contact angle can increase from relative non-wettability of more than 90° to complete wettability at 0°, in which case the fluid tends to form a film on the surface of the solid.

The electrode layer 122 is separated from the first fluid 128 and the second fluid 132 by an insulator, which may be the hydrophobic layer 126. The electrode layer 122 (and thereby the electrodes 116) is supplied with voltage signals V by a first signal line 142 as will be further described herein. A second signal line 144 is electrically connected to a top electrode (not illustrated) that is in contact with the conductive second fluid 132. This top electrode may be common to more than one electrowetting element 120 since the electrowetting elements 120 are fluidly interconnected by and share the second fluid 132 uninterrupted by the pixel walls 118. The electrowetting elements 120 are controlled by the voltage V applied between the first and second signal lines 142 and 144.

The first fluid 128 absorbs at least a part of the optical spectrum. The first fluid 128 may be transmissive for a part of the optical spectrum, forming a color filter. For this purpose, the first fluid 128 may be colored by addition of pigment particles or dye, for example. Alternatively, the first fluid 128 may be black (e.g., absorbing substantially all parts of the optical spectrum) or reflective. The hydrophobic layer 126 may be transparent or reflective. A reflective layer may reflect the entire visible spectrum, making the layer appear white, or part of it, making it have a color.

When the voltage V applied between the signal lines 142 and 144 is set at a non-zero active signal level, the electrowetting element 120 will enter into an active state. Electrostatic forces will move the second fluid 132 toward the electrode layer 122, thereby repelling the first fluid 128 from the area of the hydrophobic layer 126 to the pixel walls 118 surrounding the area of the hydrophobic layer 126, to a droplet-like shape. This action uncovers the first fluid 128 from the surface of the hydrophobic layer 126 of the electrowetting element 120. When the voltage across the electrowetting element 120 is returned to an inactive signal level of zero volts or a value near to zero volts, the electrowetting element 120 will return to an inactive state, where the first fluid 128 flows back to cover the hydrophobic layer 126. In this way, the first fluid 128 forms an electrically controllable optical switch in each electrowetting element 120.

Generally, the thin film transistor 114 includes a gate electrode that is electrically connected to a corresponding scan line of the scan lines S, a source electrode that is electrically connected to a corresponding data line (e.g., first signal line 142 of FIG. 1B) of the data lines D, and a drain electrode that is electrically connected to the pixel electrode 116. Thus, the pixel areas 112 are operated, i.e. driving of the electrowetting display device 100, based upon the scan lines S and the data lines D of FIG. 1A.

Figure 2A:
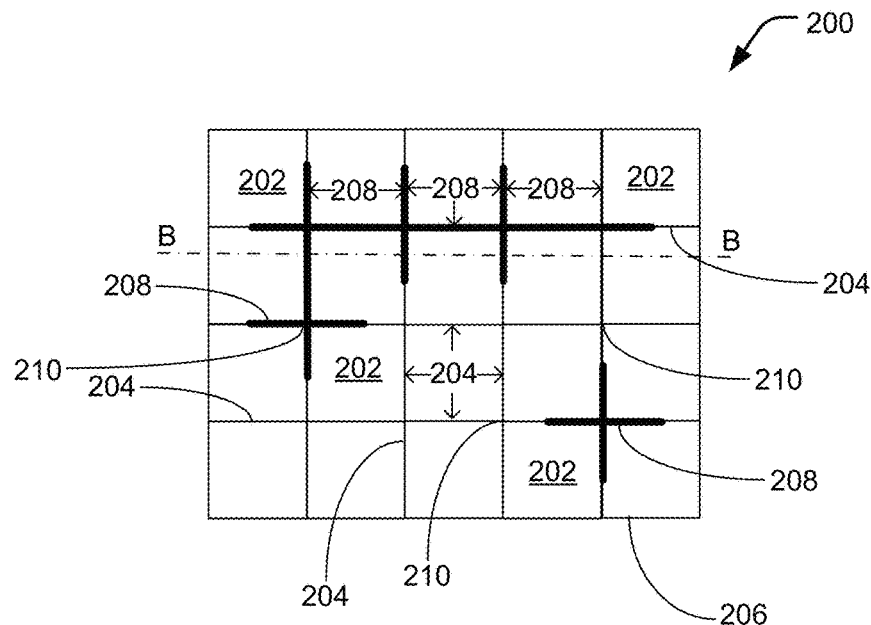
FIGS. 2A and 2B are schematic views illustrating a simplified portion of the electrowetting display device of FIGS. 1A and 1B including spacers on pixel walls.

FIG. 2A is a schematic top view of a portion 200 of the electrowetting display device 100, according to some embodiments. For example, portions of the electrowetting display device 100 may be the same as or similar to that illustrated in FIGS. 1A and 1B. The portion 200 includes a number of pixels 202 (generally corresponding to the pixel areas 112 of FIGS. 1A and 1B). Pixel walls 204 (generally corresponding to the pixel walls 118 of FIGS. 1A and 1B) surround and define individual pixels 202. The portion 200 includes an underlying bottom substrate 206 (generally corresponding to bottom substrate 124 of FIG. 1B). An overlying top substrate (generally corresponding to the top substrate 134 of FIG. 1B and not illustrated in FIG. 2A) includes spacers 208, only a few of which are illustrated for clarity, that extend from the top substrate to at least portions of tops of the pixel walls 204. In the example embodiment illustrated in FIG. 2A, the spacers 208 are cross-shaped having ends that can (but need not) connect to adjacent spacers 208. Generally, in the example embodiment illustrated in FIG. 2A, the spacers 208 are located at intersections 210 of the pixel walls 204. In some embodiments, the spacers 208 can be pillar shaped so as to extend from the top substrate to only the intersections 210 of tops of the pixel walls 204, though claimed subject matter is not limited to any such example configurations of the spacers 208. For sake of simplicity of description, only five pixels 202 are illustrated. Also, for sake of simplicity of description, only some spacers 208 are illustrated. In general, there will be spacers 208 at every intersection 210. For clarity and simplicity, FIG. 2A does not illustrate all components of the electrowetting display device 100 from FIGS. 1A and 1B.

Figure 2B:
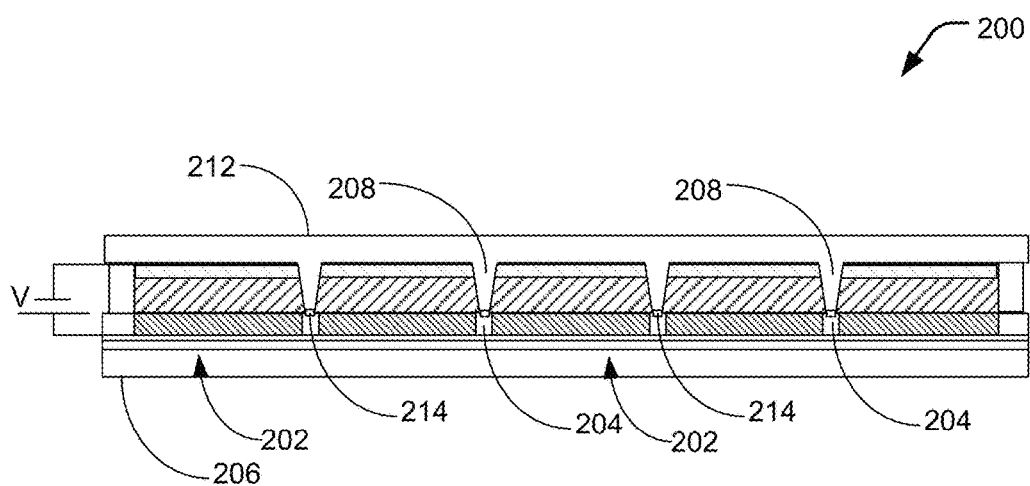

FIG. 2B is a schematic cross-section view of the portion 200 of the electrowetting display device 100 illustrated in FIG. 2A along the line B-B, according to some embodiments. FIG. 2B illustrates the bottom substrate 206 and a top substrate 212 (generally corresponding to the top substrate 134 of FIG. 1B and not illustrated in FIG. 2A). The bottom substrate 206 includes the pixel walls 204 while the top substrate 212 includes the spacers 208. In accordance with various embodiments, an adhesive 214 is included to couple the spacers 208 to the pixel walls 204. The adhesive 214 generally comprises ultraviolet (UV) curable epoxy glue, although other types of adhesive are acceptable. An example of UV curable epoxy glue is NAGASE XNR 5570. The adhesive may be transparent, may be colored (with dyes or pigments, or the solvent may contain dyes or pigments), or may be black (i.e., opaque). The addition of a colored adhesive or opaqueness of the adhesive provides the advantages of enhanced color intensity of the display device and additional contrast of the display device respectively. The adhesive may have a refractive index equal to or substantially equal to that of the material forming the pixel walls 204 or material forming the spacers 208.

Generally, as can be seen in FIG. 2B, the spacers 208 may have a tapered shape, wherein the spacer 208 is wider at a base adjacent to the top substrate 212 and narrows toward the end or top of the spacer 208 located farthest from the top substrate 212. The spacers 208 generally have a width in a range of 2-15 micrometers, with or without a tapered and more particularly, 8-12 micrometers. The spacers 208 generally have a height in a range of 0-60 micrometers and more particularly, 18-22 micrometers. In accordance with various embodiments, the spacers 208 may be a grid of hydrophilic material embedded within the top substrate 212 and thus, may have a height of zero. The pixel walls 204 generally have a width in a range of 1-20 micrometers and more particularly, 7-9 micrometers. The pixel walls 204 generally have a height of approximately 0-50 micrometers, and more particularly 2-25 micrometers. In accordance with various embodiments, the pixel walls 208 may be a grid of hydrophilic material embedded within the hydrophobic layer (e.g., the hydrophobic layer 126 of FIG. 1B) of the bottom substrate 206 and thus, may have a height of zero. The spacers 208 and the pixel walls 204 may have the same width and/or height, i.e. the spacers and the pixel walls 204 may have substantially the same or different cross-sectional dimensions with respect to one another.

Notwithstanding the above, the spacer base or top may have a variety of geometries, for example, in cross-section the geometries may be cylindrical, rectangular, square, cruciform; each and any combination thereof may be in the form of a grid.

FIGS. 3A-3J illustrate various stages of coupling the top substrate 212 with the spacers 208 to the bottom substrate 206 that includes the pixel walls 204. In general, the adhesive 214 is applied to the ends of the spacers 208. A sealing material 300 (generally corresponding to the adhesive/sealing material 136 of FIG. 1B) is applied and then the top substrate 212 is positioned over the bottom substrate 206 while the bottom substrate 206 is filled with a second fluid 302 that includes an electrolyte (generally corresponding to second fluid 132 of FIG. 1B). Coupling of the top substrate 212 to the bottom substrate 206 may be performed by a coupling method. While applying force to the two substrates 212, 206, the adhesive 214 (e.g., UV curable epoxy glue) is cured by UV light. Thus, the spacers 208 and pixel walls 204 are bonded, sealed and cured in one step. For clarity and simplicity, FIGS. 3A-3J do not illustrate all components of the electrowetting display device 100 from FIGS. 1A and 1B.

An example of a coupling method of fabricating a layer of fluid between a top substrate and a bottom substrate can involve any of a number of devices, such as a coupling device, that forces the top and bottom substrates to within a relatively close distance of one another. Initially, the top substrate is separate from the bottom substrate. After respective elements and structures (e.g., immiscible fluid, pixels walls, spacers, and so on) are provided on the top substrate and the bottom substrate, the top and bottom substrates are brought together in a laminating process that forms a laminated display panel. Such a laminating process can involve a coupling device, and for example, any method that allows squeezing the first and second substrates together. As a result, the immiscible fluid, pixel walls, and spacers are enclosed by the top and bottom substrates and an uncured adhesive/sealing material. Shortly after the laminating process, the laminated display panel is exposed to electromagnetic (EM) energy, such as ultraviolet (UV) light or heat, to cure the adhesive/seal material.

Figure 3A:
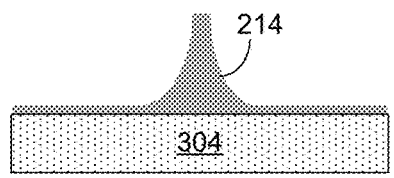
FIGS. 3A-3J are schematic views illustrating simplified example stages of assembly of the electrowetting display device of FIGS. 1A, 1B, 2A and 2B.
Figure 3B:
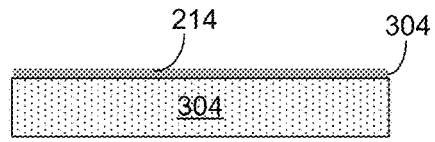

Referring back to FIGS. 3A-3J, the adhesive 214 can be applied to the ends of the spacers 208 in a variety of ways. However, care must be taken to avoid excessive adhesive 214 entering into the pixel areas 212. Thus, the amount of adhesive 214 applied to the ends of the spacers 208 needs to be controlled. Accordingly, referring to FIG. 3A, in accordance with various embodiments, a volume of adhesive 214 is applied to a flat surface of a carrier 304. Generally, the carrier 304 is made of glass. However, the carrier 304 may be made of any other type of material having a flat surface. Referring to FIG. 3B, the carrier 304 is then spun to thereby cause the adhesive 214 to spread across the flat surface of the carrier 304 to create a layer 306 of adhesive 214. The volume of adhesive 214 applied to the carrier 304 in FIG. 3A is enough to result in the layer 306 of adhesive 214 having approximately a thickness or height of 3 micrometers. In accordance with various embodiments, the carrier 304 is spun in a range of 100-500 rounds per minute (RPM) and more particularly, approximately 250 RPM.

In accordance with various embodiments, the adhesive is mixed with a solvent, e.g., an organic liquid such as, for example, acetone, tetrahydrofurane, ethylactate, etc., in order to help facilitate the spreading of the adhesive 214 during spinning of the carrier 304 so that the adhesive 214 spreads evenly across the surface of the carrier 304. The amount of adhesive 214 mixed with the solvent is in an amount up to 40% mass fraction of adhesive. The solvent substantially evaporates from the layer 306 of adhesive 214 by exposing the layer 306 of adhesive to room temperature (20-25 C) or alternatively up to the boiling temperature of the solvent. In accordance with various embodiments, the layer 306 of adhesive 214 may be heated to allow the solvent to substantially evaporate.

In addition, other methods may be used to apply or spread the adhesive 214 on the carrier 304, for example, slit coating, spray coating, printing methods and any other method that allows the application or dispensation of a film of desired thickness.

Figure 3C:
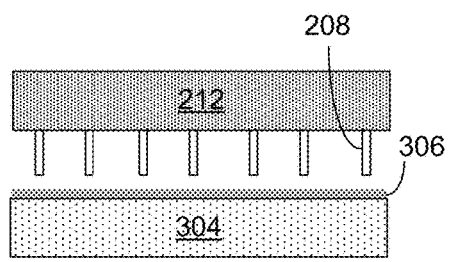
Figure 3D:
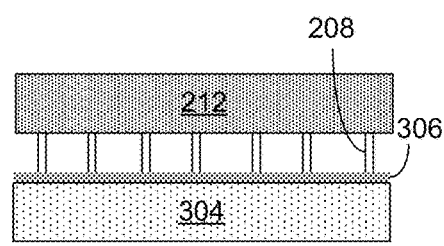
Figure 3E:
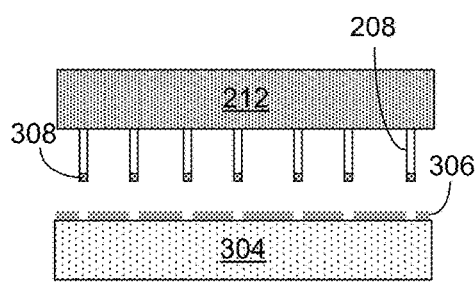

Referring to FIGS. 3C and 3D, after the solvent has substantially evaporated from the layer 306 of adhesive 214, the top substrate 212 that includes the spacers 208 is moved towards the carrier 304 such that ends of the spacers 208 are engaged with the layer 306 of adhesive 214 applied on the carrier 304. As can be seen in FIG. 3E, when the top substrate 212 is moved away from the carrier 304 such that the ends of the spacers 208 are disengaged from the layer 306 of adhesive 214, about half of the layer 306 of adhesive 214 is picked up by the ends of the spacers 208. Thus, an amount 308 of adhesive 214 on the ends of the spacers 208 has a thickness of 0.1-10 micrometers but should not be excessive such that the adhesive flows into the pixel. As previously noted, in accordance with various embodiments, the adhesive 214 is UV curable epoxy glue such as, for example, NAGASE XNR 5570. The NAGASE XNR 5570 generally has a viscosity of about 120 Pascal seconds.

Generally, glues having a viscosity in a range of 50-150 Pascal seconds may be used for adhesive 214.

Figure 3F:
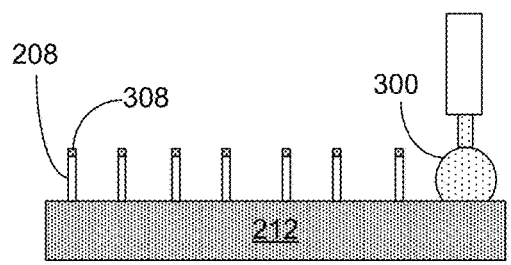

Referring to FIG. 3F, the sealing material 300 is applied to the top substrate 212 at an outer edge of the top substrate 212. As previously discussed, the sealing material 300 will provide a seal around the borders of the electrowetting display device 100.

Figure 3G:
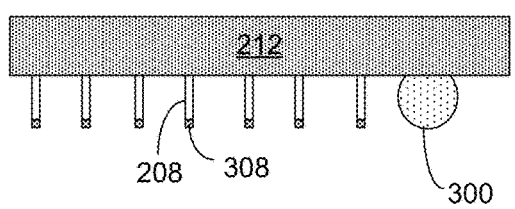
Figure 3H:
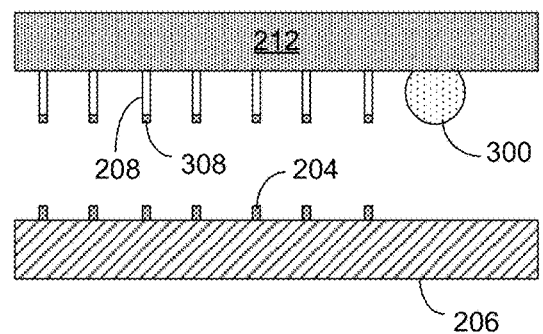
Figure 3I:
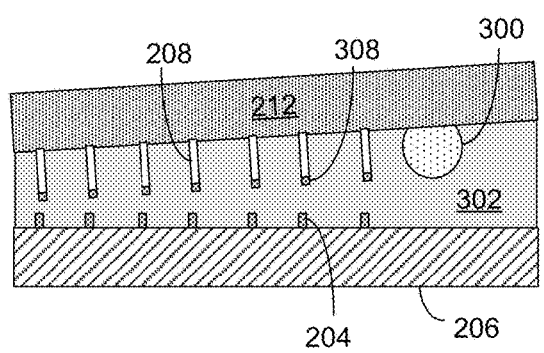
Figure 3J:
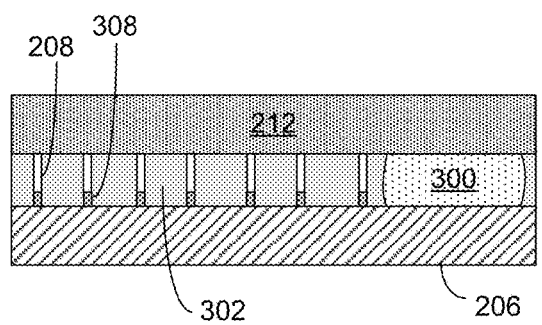

Referring to FIGS. 3G and 3H, the top substrate 212 with the spacers 208 and the sealing material 300 is flipped and then positioned with respect to the bottom substrate 206 and the pixel walls 204. Referring to FIGS. 3I and 3J, the top substrate 212 is then coupled to the bottom substrate 206 via, for example, a roll coupling method, an air film coupling method, etc., such that the spacers 208 are coupled to the pixel walls 204 via the amount 306 of adhesive 214. While coupling the top substrate 212 to the bottom substrate 206, the second fluid 302 that includes an electrolyte is filled in between the top substrate 212 and the bottom substrate 206. Additionally, UV light is applied to thereby simultaneously cure the adhesive 214 (UV curable epoxy glue) and the sealing material 300 (UV curable epoxy glue).

Moreover, other types of adhesive materials may be implemented such as pressure sensitive adhesives, structured tapes, heat curing adhesives in general and any non-curable adhesives. The pressure sensitive adhesive may be transparent, may have a refractive index equal to or substantially equal to the pixel wall material or the spacer material, may be colored, or may be black. A colored or black pressure sensitive adhesive enhances the color intensity and contrast respectively of the display device. The pressure sensitive adhesive may have a refractive index equal to or substantially equal to the pixel wall material or the spacer material.

In accordance with various embodiments, by bonding the top of the spacers to the tops of the pixel walls, relative movement between the spacers and the pixel walls, and hence relative movement of the top substrate to the bottom substrate, is avoided. By providing more stability between the top substrate and the bottom substrate, oil pick-up by the top substrate can be prevented. Also, gaps between the spacers and the pixels are minimized or eliminated due to the presence of the adhesive between the spacers and the pixel walls. By reducing or eliminating the gaps, this further improves the stability of the electrowetting display device 100 and helps prevent the whitening effect caused by applied pressure and movement to the top substrate. Also, the improved stability helps protect the electrowetting display device from damage that can be caused by impact.

While embodiments of the present disclosure have been described with respect to electrowetting displays, other types of displays can benefit from the present disclosure. For example, LCDs, electrophoretic displays, cholesteric LCDs, and other display technologies that utilize fluids can benefit from the present disclosure and thus, the present disclosure is not limited to electrowetting displays.

Figure 4:
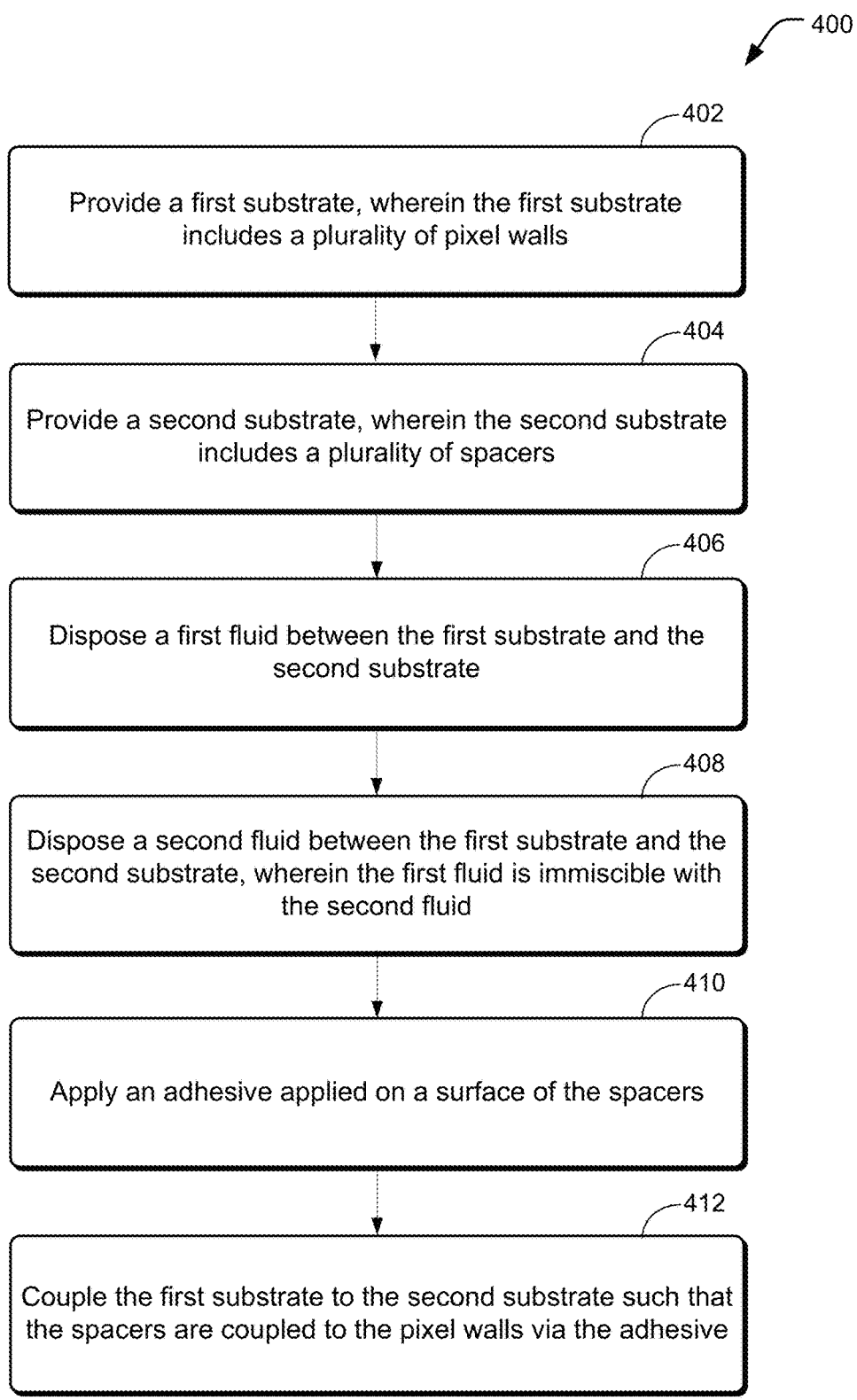
FIG. 4 is a flowchart illustrating an example of a process of making an electrowetting display device.

FIG. 4 is a flowchart illustrating a process 400 of an example of making an electrowetting display device, for example an electrowetting display device as described in FIGS. 1A, 1B, 2A and 2C. At 402, a first substrate is provided, wherein the first substrate includes a plurality of pixel walls. At 404, a second substrate is provided, wherein the second substrate includes a plurality of spacers. At 406, a first fluid is disposed between the first substrate and the second substrate. At 408, a second fluid is disposed between the first substrate and the second substrate, wherein the first fluid is immiscible with the second fluid. At 410, an adhesive is applied on a surface of the spacers. At 412, the first substrate is coupled to the second substrate such that the spacers are coupled to the pixel walls via the adhesive.

Figure 5:
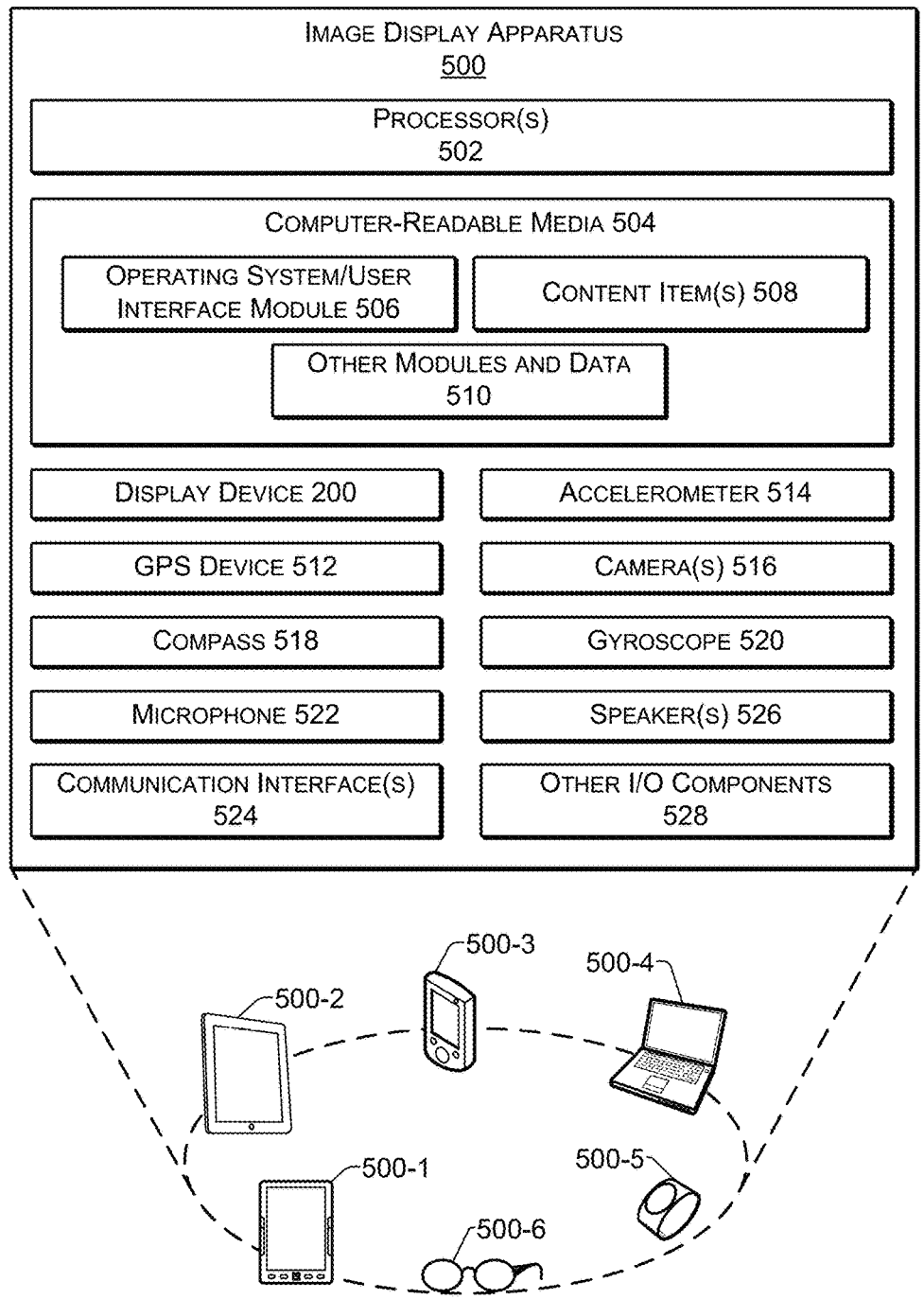
FIG. 5 illustrates select components of an example image display apparatus that may include an electrowetting display device, according to various embodiments.

FIG. 5 illustrates select example components of an example image display apparatus 500 that may be used with the electrowetting display device 100 according to some implementations. Other types of displays may also be used with the example image display apparatus 500. Such types of displays include, but are not limited to, LCDs, cholesteric displays, electrophoretic displays, electrofluidic pixel displays, photonic ink displays, and the like.

The image display apparatus 500 may be implemented as any of a number of different types of electronic devices. Some examples of the image display apparatus 500 may include digital media devices and eBook readers 500-1; tablet computing devices 500-2; smart phones, mobile devices and portable gaming systems 500-3; laptop and netbook computing devices 500-4; wearable computing devices 500-5; augmented reality devices, helmets, goggles or glasses 500-6; and any other device capable of connecting with the electrowetting display device 100 and including a processor and memory for controlling the display according to the techniques described herein.

In a very basic configuration, the image display apparatus 500 includes, or accesses, components such as at least one control logic circuit, central processing unit, or processor 502, and one or more computer-readable media 504. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some cases, the processor 502 may be one or more hardware processors and/or logic circuits of any suitable type specifically programmed or configured to execute the algorithms and processes described herein. The processor 502 can be configured to fetch and execute computer-readable instructions stored in the computer-readable media 504 or other computer-readable media. The processor 502 can perform one or more of the functions attributed to the timing controller 102, the data driver 104, and/or the scan driver 106 of the electrowetting display device 100. The processor 502 can also perform one or more functions attributed to a graphic controller (not illustrated) for the electrowetting display device.

Depending on the configuration of the image display apparatus 500, the computer-readable media 504 may be an example of tangible non-transitory computer storage media and may include volatile and nonvolatile memory and/or removable and non-removable media implemented in any type of technology for storage of information such as computer-readable instructions, data structures, program modules or other data. The computer-readable media 504 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the image display apparatus 500 may access external storage, such as RAID storage systems, storage arrays, network attached storage, storage area networks, cloud storage, or any other medium that can be used to store information and that can be accessed by the processor 502 directly or through another computing device or network. Accordingly, the computer-readable media 504 may be computer storage media able to store instructions, modules or components that may be executed by the processor 502.

The computer-readable media 504 may be used to store and maintain any number of functional components that are executable by the processor 502. In some implementations, these functional components comprise instructions or programs that are executable by the processor 502 and that, when executed, implement operational logic for performing the actions attributed above to the image display apparatus 500. Functional components of the image display apparatus 500 stored in the computer-readable media 504 may include the operating system and user interface module 506 for controlling and managing various functions of the image display apparatus 500, and for generating one or more user interfaces on the electrowetting display device 100 of the image display apparatus 500.

In addition, the computer-readable media 504 may also store data, data structures and the like, that are used by the functional components. For example, data stored by the computer-readable media 504 may include user information and, optionally, one or more content items 508. Depending on the type of the image display apparatus 500, the computer-readable media 504 may also optionally include other functional components and data, such as other modules and data 510, which may include programs, drivers and so forth, and the data used by the functional components. Further, the image display apparatus 500 may include many other logical, programmatic and physical components, of which those described are merely examples that are related to the discussion herein. Further, while the figures illustrate the functional components and data of the image display apparatus 500 as being present on the image display apparatus 500 and executed by the processor 502 on the image display apparatus 500, it is to be appreciated that these components and/or data may be distributed across different computing devices and locations in any manner.

FIG. 5 further illustrates examples of other components that may be included in the image display apparatus 500. Such examples include various types of sensors, which may include a GPS device 512, an accelerometer 514, one or more cameras 516, a compass 518, a gyroscope 520, a microphone 522, and so forth.

The image display apparatus 500 may further include one or more communication interfaces 524, which may support both wired and wireless connection to various networks, such as cellular networks, radio, Wi-Fi networks, close-range wireless connections, near-field connections, infrared signals, local area networks, wide area networks, the Internet, and so forth. The communication interfaces 524 may further allow a user to access storage on or through another device, such as a remote computing device, a network attached storage device, cloud storage, or the like.

The image display apparatus 500 may further be equipped with one or more speakers 526 and various other input/output (I/O) components 528. Such I/O components 528 may include a touchscreen and various user controls (e.g., buttons, a joystick, a keyboard, a keypad, etc.), a haptic or tactile output device, connection ports, physical condition sensors, and so forth. For example, the operating system 506 of the image display apparatus 500 may include suitable drivers configured to accept input from a keypad, keyboard, or other user controls and devices included as the I/O components 528. Additionally, the image display apparatus 400 may include various other components that are not illustrated, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An electrowetting display device comprising:
   a first substrate, wherein the first substrate comprises a plurality of pixel walls that intersect to define a plurality of pixel areas;
   a hydrophobic surface on the first substrate;

an electrowetting oil on the hydrophobic surface and a fluid that includes an electroconductive or polar liquid on the electrowetting oil;

the first substrate including an electrode for applying an electric field in the plurality of pixel areas;

a second substrate opposite to the first substrate, wherein the second substrate comprises a plurality of spacers, and wherein the plurality of spacers are bonded to corresponding pixel walls at intersections of the pixel walls; and an ultraviolet (UV) curable epoxy glue that couples the spacers to the pixel walls.

2. The electrowetting display device of claim 1, wherein the spacers each have an end connected to the second substrate that is wider than a corresponding end of the spacers that is bonded to the corresponding pixel walls such that the spacers each have a tapered shape.

3. The electrowetting display device of claim 1, wherein the corresponding pixel walls each have a height in a range of 2-25 micrometers and a width in a range of 7-9 micrometers.

4. The electrowetting display device of claim 1, wherein the UV curable epoxy glue has a viscosity in a range of 50-150 Pascal seconds.

5. An electrowetting display device comprising:
a first substrate including a plurality of pixel walls;
a second substrate including a plurality of spacers;
a first fluid and a second fluid disposed between the first substrate and the second substrate, the first fluid being immiscible with the second fluid; and
an adhesive coupling the spacers to the pixel walls.

6. The electrowetting display device of claim 5, wherein the spacers each have a height in a range of 18-22 micrometers and a width in a range of 8-12 micrometers at a top of the spacers.

7. The electrowetting display device of claim 6, wherein cross-sectional dimensions of the spacers are substantially the same as cross-sectional dimensions of the pixel walls.

8. The electrowetting display device of claim 6, wherein cross-sectional dimensions of the spacers are substantially different from cross-sectional dimensions of the pixel walls.

9. The electrowetting display device of claim 5, wherein the spacers each have an end connected to the second substrate that is wider than a corresponding end of the spacers that is coupled to the pixel walls such that the spacers have a tapered shape.

10. The electrowetting display device of claim 5, wherein the pixel walls each have a height in a range of 2-25 micrometers and a width in a range of 7-9 micrometers.

11. The electrowetting display device of claim 10, wherein cross-sectional dimensions of the spacers are substantially the same as cross-sectional dimensions of the pixel walls.

12. The electrowetting display device of claim 10, wherein cross-sectional dimensions of the spacers are substantially different from cross-sectional dimensions of the pixel walls.

13. The electrowetting display device of claim 5, wherein the adhesive is UV curable epoxy glue or a pressure sensitive adhesive, and wherein the adhesive has a viscosity in a range of 50-150 Pascal seconds.

14. The electrowetting display device of claim 5, wherein the adhesive is UV curable epoxy glue having a thickness in a range of 1-10 micrometers.

15. The electrowetting display device of claim 5, wherein the adhesive is one of (i) transparent, (ii) colored or (iii) black.

16. The electrowetting display device of claim 5, wherein the adhesive has a refractive index that is equal to or substantially equal to a refractive index of material comprised by the pixel walls or material comprised by the spacers.

17. A method of making an electrowetting device, the method comprising:
providing a first substrate, wherein the first substrate includes a plurality of pixel walls;
providing a second substrate, wherein the second substrate includes a plurality of spacers;
disposing a first fluid between the first substrate and the second substrate;
disposing a second fluid between the first substrate and the second substrate, wherein the first fluid is immiscible with the second fluid;
applying an adhesive on ends of the spacers; and
coupling the first substrate to the second substrate such that the spacers are coupled to the pixel walls via the adhesive.

18. The method of claim 17, wherein applying the adhesive on the ends of the spacers comprises:
applying the adhesive on a surface of a carrier;
spreading the adhesive on the surface of the carrier to create a layer of adhesive;
positioning the second substrate such that the ends of the spacers face the carrier;
engaging the ends of the spacers with the layer of adhesive; and
disengaging the ends of the spacers such that an amount of adhesive remains disposed on the ends of the spacers.

19. The method of claim 18, wherein spreading the adhesive on the surface of the carrier to create the layer of adhesive comprises spinning the carrier.

20. The method of claim 19, further comprising, prior to applying the adhesive on a surface of a carrier, adding a solvent to the adhesive.

21. The method of claim 20, further comprising, prior to engaging the ends of the spacers with the layer of adhesive, allowing the solvent to substantially evaporate from the adhesive.

22. The method of claim 20, further comprising, prior to engaging the ends of the spacers with the layer of adhesive, heating the solvent and adhesive to allow the solvent to substantially evaporate from the adhesive.

23. The method of claim 18, wherein applying the adhesive on ends of the spacers comprises one of slit coating or spray coating.

24. The method of claim 18, wherein engaging the ends of the spacers with the layer of adhesive comprises moving one of the second substrate or the carrier towards one another.

* * * * *